UNITED STATES PATENT OFFICE.

ERIC EDWARD DUTT, OF JABALPUR, INDIA.

PROCESS FOR THE MANUFACTURE OF ALUMINA.

1,332,113.   Specification of Letters Patent.   Patented Feb. 24, 1920.

No Drawing.   Application filed October 18, 1918. Serial No. 258,709.

*To all whom it may concern:*

Be it known that I, ERIC EDWARD DUTT, a subject of the King of Great Britain, residing at Jabalpur, India, have invented a new and Improved Process for the Manufacture of Alumina, of which the following is a full, clear, and exact description.

The invention relates to a process for the manufacture of alumina from bauxite, or any other mineral or compound one of the ingredients of which is aluminum.

The substance containing aluminum is mixed with a suitable hydrate and alkali metal chlorid, some carbon, and the whole mass subjected to heat and to the action of arsenic trioxid.

The substances above mentioned are preferably used in powdered form and in proportion as given below.

Calcined bauxite (containing about 70% of $Al_2O_3$) 400 parts. The alkali metal chlorid used is preferably sodium chlorid, 351 parts. The hydrate is preferably a calcium hydrate, 222 parts. Carbon, preferably coke or charcoal, 40 parts.

The mixture of the above-mentioned ingredients is placed in a retort made of suitable refractory material. At one end the retort is provided with an inlet tube, and at the other end suitable appliances for charging and discharging the retort are provided and also a delivery tube for exhausting the gases.

The retort is heated to a red heat. The arsenic compound I prefer to use is trioxid, which is introduced into the hot charge in the retort in a state of vapor. The quantity used is 133 parts. It is prepared in a separate apparatus, for the boiling point of arsenic trioxid is 218° C., which temperature is considerably below the temperature at which the reaction takes place in the retort.

The arsenic trioxid is introduced through the inlet tube, and the contact of same with the charge is insured for its is forced to cross the entire charge before it can reach the outlet from the retort. The trioxid of the arsenic at the temperature of the retort combines with the chlorin of the sodium chlorid forming arsenic trichlorid, the sodium reacting with the aluminum forming sodium aluminate. The calcium hydroxid reacts with the carbon present, forming carbonate; but in view of the high temperature of the retort it is partly decomposed, yielding a mixture of calcium oxid and calcium carbonate, and some carbon dioxid is given off. Silica, iron and other impurities present in the bauxite or other compound used remain unaffected.

The arsenic trichlorid which is formed together with hydrogen and carbon dioxid pass out of the retort through the tube and are conveyed into a suitable condenser, where arsenic trichlorid is condensed into a liquid, while hydrogen and carbon dioxid pass off in a gaseous state. The liquid may be collected and treated with water. The resulting liquid will be a mixture of arsenic trioxid and arsenic trichlorid and hydrochloric acid. The whole is neutralized, which causes the rest of the arsenic trichlorid to decompose to arsenic trioxid. The liquid obtained is evaporated to dryness. The residue is placed into a retort and the arsenic trioxid distilled over for the next operation.

After the required amount of arsenic trioxid vapors have been introduced and the reactions are completed, the charge is removed from the retort and treated with water. The sodium aluminate will pass into solution, leaving behind a mixture consisting of calcium carbonate, calcium hydroxid, and the impurities contained in the bauxite (or other aluminous compound used) as insoluble residue. The solution of sodium aluminate is decanted from the insoluble residue and carbon dioxid is passed into the clear solution until precipitation of aluminum hydroxid is complete. If desired the solution of sodium aluminate may be evaporated to dryness and sodium aluminate obtained instead of aluminum hydroxid and sodium carbonate. The liquid obtained consists of a mixture of insoluble hydroxid or aluminum and soluble sodium carbonate. This solution of sodium carbonate is decanted or filtered from the insoluble aluminum hydroxid and evaporated to dryness. The residue will be sodium carbonate.

The aluminum hydroxid obtained is washed, dried and calcined to drive off the water of hydration. The residue consists of alumina. The carbon dioxid necessary for the treatment of the sodium aluminate as above mentioned may be obtained from the decomposition of the calcium carbonate formed in the retort, that is, formed in the earlier stage of the process and which has been separated from the condensed arsenic trichlorid and with which hydrogen is present. The hydrogen present in the carbon dioxid escapes, while the carbon dioxid reacts with the sodium aluminate.

I claim:

1. The process for the manufacture of alumina which consists in mixing a substance containing a compound of aluminum with an alkali metal chlorid, an alkali earth metal hydrate and carbon, subjecting the mixture to a temperature of about red heat, passing vapors of arsenic trioxid through the hot mixture to convert the aluminum in the substance into an alkali metal aluminate, lixiviating the so treated mass to dissolve out the aluminate, precipitating the aluminum hydroxid from the solution by treating it with $CO_2$ to form a soluble alkali metal carbonate, separating the precipitate from the solution, and heating the precipitate to form the alumina by driving off the water of hydration.

2. A process for the manufacture of alumina which consists in mixing a substance containing a compound of aluminum with sodium chlorid, calcium hydrate and carbon, heating the mixture to a temperature of about red heat, passing through the hot mixture arsenic trioxid to convert the aluminum in the substance into sodium aluminate, dissolving out the sodium aluminate, passing $CO_2$ through the solution of the aluminate to precipitate aluminum hydroxid, separating the precipitate from the liquid, and calcining the precipitate to drive off the water of hydration.

3. The process for the manufacture of alumina which consists in mixing bauxite with sodium chlorid, calcium hydrate and carbon, heating the mixture to a temperature of about red heat, passing arsenic trioxid through the hot mixture to convert the aluminum in the bauxite into sodium aluminate, dissolving out the sodium aluminate from the so-treated mass, precipitating the aluminum hydroxid by treating the aluminate with $CO_2$, separating the liquid from the precipitate, and calcining the precipitate to drive off the water of hydration.

4. The herein described step in the process of manufacturing alumina which consists in subjecting bauxite to gaseous arsenic trioxid in the presence of sodium chlorid, a mixture of calcium hydrate and carbon.

ERIC EDWARD DUTT.